(No Model.)
W. KOENEN.
MEAT CUTTER.
No. 522,424. Patented July 3, 1894.
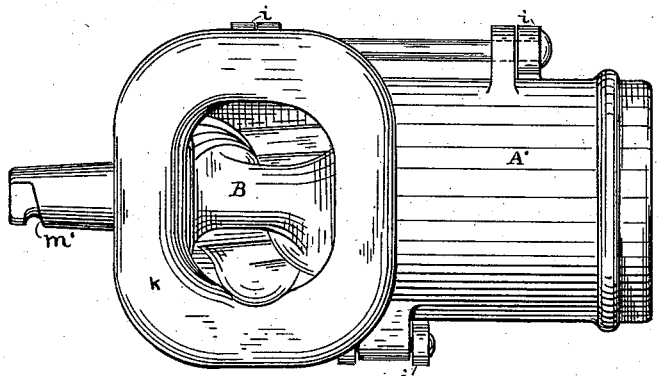
Fig. 1
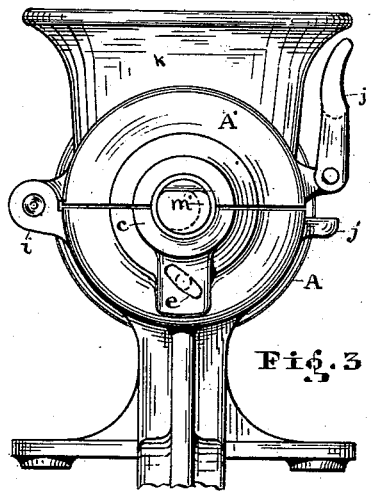
Fig. 3
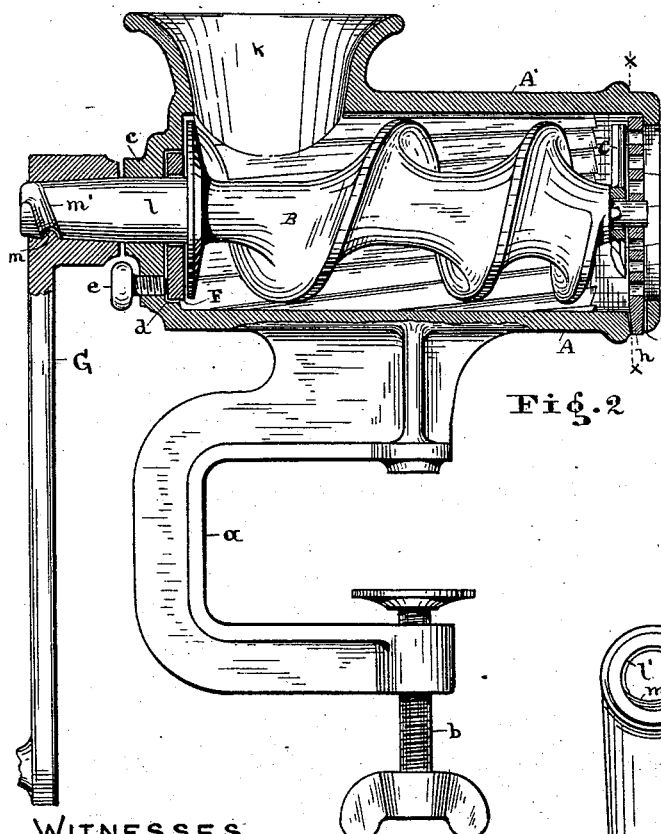
Fig. 2
Fig. 5
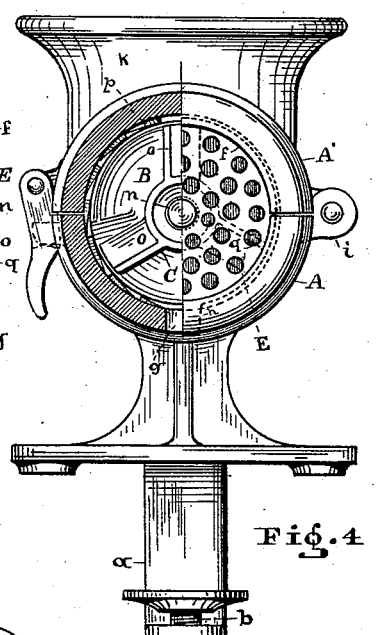
Fig. 4
WITNESSES
R. F. Laganke.
E. L. Kistner.
INVENTOR
William Koenen
By B. F. Eibler, Attorney.

UNITED STATES PATENT OFFICE.

WILLIAM KOENEN, OF CLEVELAND, OHIO.

MEAT-CUTTER.

SPECIFICATION forming part of Letters Patent No. 522,424, dated July 3, 1894.

Application filed November 20, 1893. Serial No. 491,481. (No model.)

*To all whom it may concern:*

Be it known that I, WILLIAM KOENEN, a citizen of the United States, residing at Cleveland, in the county of Cuyahoga and State of Ohio, have invented a new and useful Meat-Cutter, of which the following is a specification.

My invention relates to improvements in meat cutting machines in which a revolving worm shaft and knife operate in conjunction with a fixed perforated disk; and the objects of my improvement are: first, to mount and inclose said shaft, knife and disk in parting or hinged shells, thus enabling a thorough and convenient cleaning of said parts; second, to afford facilities for a proper adjustment of said knife in respect to the disk, and, third to so construct and arrange said knife and disk as to admit the use of both sides of each, which enhances the serviceableness of said machine. I attain these objects by the mechanism illustrated in the accompanying drawings, in which—

Figure 1 is a plan view of said cutter. Fig. 2 represents a central vertical section of the same. Fig. 3 is a partial front end view. Fig. 4 is a rear end view and part sectional view on line $x\ x$; see Fig. 2. Fig. 5 is a partial face view of the crank used in connection with said worm shaft.

Similar letters refer to similar parts throughout the several views.

The shells A and A', the worm shaft B, the knife C and the disk E constitute the essential parts of the meat cutter above referred to.

Shown in connection with the lower shell A is a clamping device which consists of the bracket $a$ and the thumb screw $b$, the latter affords a means of securing the machine to any suitable table, bench, &c. In connection with the rear end of each of the shells is formed the bearing $c$ for the shaft, and also a cavity $d$ for the set collar F, which can be adjusted by means of the screw $e$. See Figs. 2 and 3. This collar, which is flat, bears against the disk formed at the termination of the worm on shaft B and forms a broad bearing surface to resist the endwise pressure of the worm shaft as it is revolved. The front of the shells is open and flanged as seen at $f$, also the socket $g$ is provided for to receive the shank $h$ of the disk E. The interior of each of the shells A and A' is corrugated. See Figs. 2 and 4. The upper shell A' is hinged to the shell A, see $i\ i$ Figs. 3 and 4, and provided with a latch $j$, which is turned over the lug $j'$ for the purpose of locking said shells. The flaring mouth $k$ is placed to be at the head of the conveyer or worm shaft B, which extends through the entire length of the shells A and A'. Outside of the bearing $c$ the journal $l$ terminates in a cone, attached to which is the crank G. The bore $l'$ in the hub of said crank presents the counterpart for said cone, and the lip $m$ within said bore is adapted for engagement in the spiral groove $m'$ of the cone. The crank can thus be readily secured to said shaft and also removed when so desired. The pivot $n$ is journaled in the disk E, see Figs. 2 and 4, and carries the knife C with it, which is placed between the end of the worm and the disk E. The knife C is constructed in the form of a spider of which the blades $o$ are adapted for cutting on both sides, see Fig. 2, which illustrates a part side and part sectional view thereof. The knife can thus be used reversely and also the disk, when either or both parts become worn on the side first used. As above stated the shank $h$ of the disk fits into the socket $g$ of the shell A to prevent the former from turning in sliding of the knife over said disk. An accurate adjustment of the knife onto the disk is readily attained by means of the set screw $e$, see Figs. 2 and 3, in fact lost motion of all parts can thereby be avoided.

The machine is charged through the mouth $k$, from where the worm shaft conveys the charge to the knife and disk for being cut and then pressed through the perforations $p$. The corrugations $q$ partially cut and prepare the stuff for the knife, thus facilitating the work of the latter and increasing the efficiency of the implement.

I claim—

A meat cutter comprising the internally corrugated hinged shells, the perforated disk E at one end thereof, the worm B having one end journaled in said disk and its opposite end having a disk and a tapering extension extending through the end walls of the shells and carrying a crank, a collar seated in a recess in the end walls of the shells and bearing against the disk on the worm shaft, and a set screw for adjusting said collar to take up any looseness, substantially as described.

WILLIAM KOENEN.

Witnesses:
BERNHARD F. EIBLER,
R. F. LAGANKE.